Patented May 30, 1939

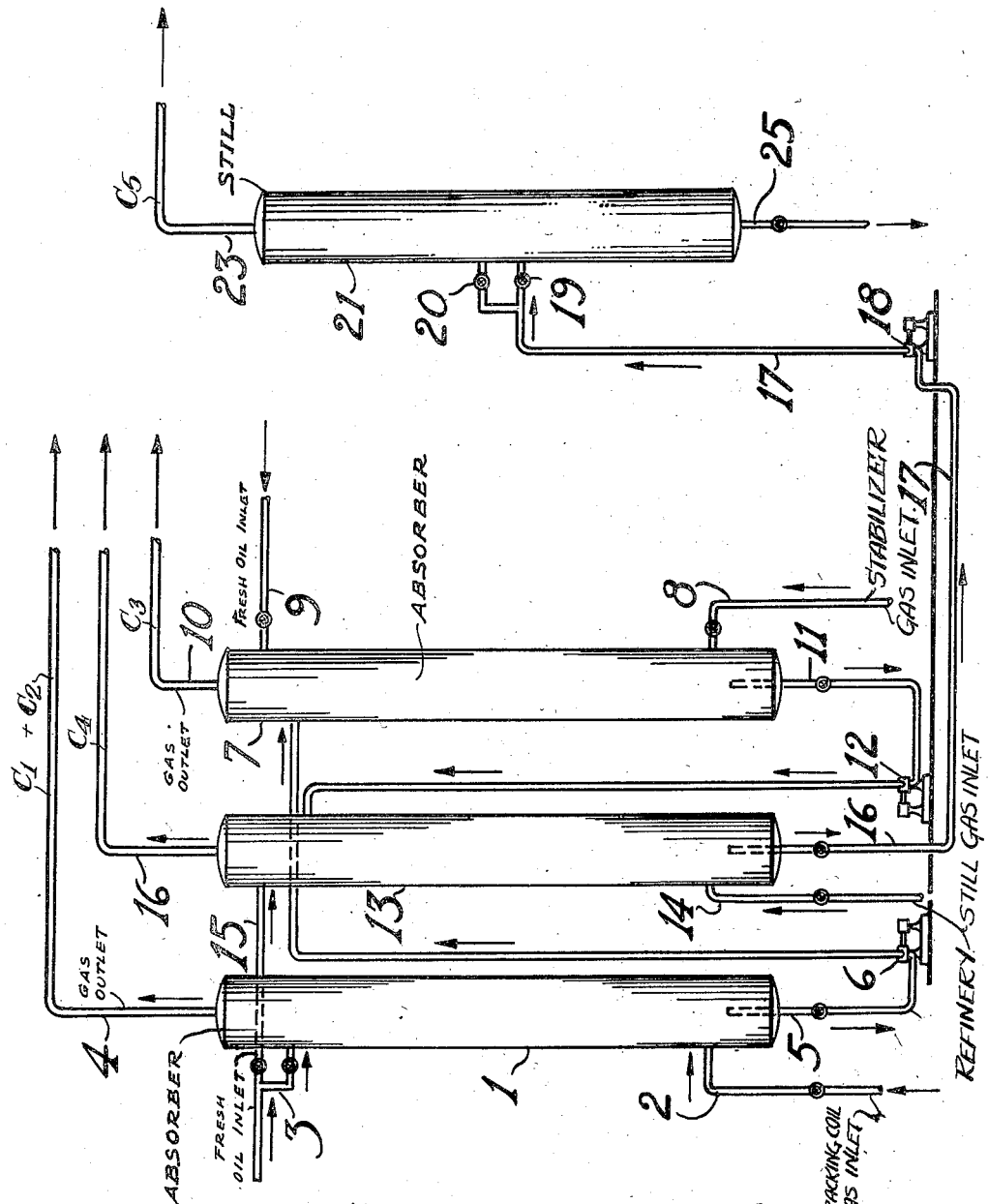

2,160,163

UNITED STATES PATENT OFFICE 2,160,163

PROCESS FOR FRACTIONATING GASEOUS MIXTURES

Henry Janney Nichols, Jr., Scotch Plains, and George L. Mateer, Roselle, N. J., assignors to Standard Oil Development Company, a corporation of Delaware Application March 9, 1934, Serial No. 714,792

2 Claims. (Cl. 260—666)

This invention relates to a process for the separation of valuable components from mixtures of hydrocarbon gases or vapors by absorption in oil and to improvements in gas absorption equipment.

Principal objects of this invention are to separate mixtures of hydrocarbons by absorption in a liquid absorbent and to obtain hydrocarbon vapors having a definite number of carbon atoms from the said mixtures.

The invention will be fully understood from the following description read in connection with the accompanying drawing, in which the figure is a diagrammatic side elevation of preferred equipment.

In the drawing, numeral 1 denotes an absorber of the usual type receiving gas from line 2. This line may be supplied with a gas from a cracking coil still or other source. A typical composition for such a gas is 50% methane, 20% $C_2$ hydrocarbons, 15% $C_3$ hydrocarbons, 10% $C_4$ hydrocarbons, and the remainder $C_5$ and higher. The absorber preferably contains plates which are alternately joined to the opposite sides so that the ascending gases and a descending absorbent oil may come into intimate contact. Other types of absorbers may be used such as packed towers.

Absorbent oil is supplied to the upper part of the absorber 1 through line 3. An outlet 4 is provided to remove the gas after contacting with the absorbent oil. The absorbent oil is removed from the absorber 1 by line 5 and by means of pump 6 is passed into the upper part of absorber 7. Line 8 is provided to pass a gas such as that obtained by stabilization of cracked distillate and containing hydrocarbon vapors having low numbers of carbon atoms. A typical composition for such a gas is 5% methane, 20% $C_2$ hydrocarbons, 50% $C_3$ hydrocarbons, and 25% $C_4$ hydrocarbons. Fresh oil may be introduced into the absorber through line 9. The gas, after contacting with the absorbent oil, is removed through line 10. The absorbent oil containing the hydrocarbon vapors that have been absorbed is removed through line 11 and by means of pump 12 is passed into the upper part of absorber 13. Line 14 is used to supply gas to the lower part of this tower. The gas that is supplied to this tower is cracked gas resulting from the cracking stills and refinery gas obtained during the distillation of crude oils, and low boiling fractions such as gasoline and kerosene. A typical composition for such a gas mixture is 30% methane, 20% $C_2$ hydrocarbons, 20% $C_3$ hydrocarbons, 15% $C_4$ hydrocarbons, and the remainder $C_5$ and higher hydrocarbons. Fresh oil is supplied to the absorber 13 through line 15.

The resulting gas, after contacting with the absorbent oil, is removed through line 16. The absorbent oil containing the absorbed gases is then passed through line 17 by means of pump 18 and valves 19 and 20 into still 21 where the absorbed vapors are vaporized and passed through line 23 to condenser, not shown. The absorbent oil from which all the desired hydrocarbon vapors have been removed is then passed through line 25 and may be returned to the absorbers to be recycled once more.

To illustrate this process the following example is given: In connection with the manufacture of hydrogen it is desirable to scrub a gas substantially free of propane as well as all higher hydrocarbons. At the same time it is desirable to discard butane to fuel in order to meet volatility specifications on motor gasoline. In addition to these two conditions it is desirable to produce a gas free of butane and high in propane cut and therefore propylene for the manufacture of isopropyl alcohol.

Cracking coil gas is passed into absorber 1 where sufficient fresh lean oil is delivered through line 3 to substantially remove all the hydrocarbons having three or more carbon atoms. The gas released from absorber 1 through line 4 is used in connection with the manufacture of hydrogen. Stabilizer gas, containing perhaps 25-35% butane, is delivered through line 8 to absorber 7. The absorbent oil from absorber 1 is delivered through line 5 and pump 6 to an intermediate point in absorber 7. The necessary amount of stripped lean oil is pumped to the top of absorber 7 through line 9 to complete the removal of all butane. The gas released from absorber 7 through line 10 is used in connection with the manufacture of isopropyl alcohol. The major portion of the refinery gas, in which the partial pressure of butane is less than in the absorbent oil from the absorber 7, is delivered through line 14 to the absorber 13. The absorbent oil from absorber 7 is delivered through line 11 and pump 12 to an intermediate point in absorber 13. Thus, relatively large quantities of this undesirable butane will be flashed off into gas from the absorbent oil and released through the top of absorber 13 through line 16 to the fuel system. The necessary amount of stripped lean oil is pumped to the top of absorber 13 through line 15 to insure the complete recovery of all the pentane and heavier hydrocarbons. The absorbent oil from the absorber 13 containing only a small fraction of hydrocarbons having less than four carbon atoms and a major fraction of hydrocarbons having more than four carbon atoms is then removed to still 21 through line 17 and pump 18. In these stills all desirable hydrocarbons are vaporized and condensed and used for blending with gasoline. The stripped oil from the stills is then recycled through the process.

It is highly essential in this process that definite ratios of absorbent oil and gas that is contacted with it be maintained in order that the desired fractions of hydrocarbon vapors may be removed and the desired fractions of hydrocarbon vapors may be separated. By this process, with a minimum oil circulation a hydrocarbon vapor is obtained which consists substantially of methane ethylene and ethane. Another fraction is obtained which consists substantially of propane, propylene and small portions of ethane, ethylene and methane, and is used in the manufacture of alcohol. The third separated hydrocarbon fraction that is not absorbed by the absorbent oil and which consists substantially of butane and small portions of propane, propylene, ethane, ethylene, methane and hydrogen is used as a fuel. The absorbent oil after passing through the three absorbers has in solution only a small fraction of the butane with which it has been contacted and a major fraction of the higher boiling hydrocarbon vapors.

It will be understood that the system illustrated is operated in the customary manner except for the regulation specified. Gas oil or the like is used as the absorption medium. Steam directly discharged into the bottom of the stills is preferred but other equivalent distilling means may be used.

The foregoing description is merely illustrative and various changes and alternative arrangements may be made within the scope of the appended claims in which it is our intention to claim all inherent novelty in the invention as broadly as the prior art permits.

We claim:

1. A process for recovering from refinery gases of different compositions, mainly composed of $C_1$ to $C_4$ hydrocarbons, a gas mixture adapted for conversion by steam into hydrogen and a gas mixture composed mainly of $C_3$ hydrocarbons adapted for use in the manufacture of isopropyl alcohol, which comprises contacting a gas mixture relatively richer in $C_1$ and $C_2$ hydrocarbons than in $C_3$ and $C_4$ hydrocarbons with a sufficient amount of absorbent oil having solvent properties for all of the constituents to absorb hydrocarbons having more than 2 carbon atoms, whereby a residual gas composed mainly of $C_1$ and $C_2$ hydrocarbons is obtained and the absorbent oil is enriched in $C_3$ and $C_4$ hydrocarbons, and contacting the thus enriched oil with a gas mixture in which $C_3$ hydrocarbons predominate, and containing $C_4$ hydrocarbons, whereby, through the effect of vapor pressure, the $C_3$ hydrocarbons in the absorbent oil and in the gas mixture are given off and the oil becomes enriched in $C_4$ hydrocarbons.

2. A process according to claim 1, in which the absorbent oil rich in $C_4$ hydrocarbons is contacted with a gas mixture containing $C_5$ and higher hydrocarbons together with $C_1$ to $C_4$ hydrocarbons and having a lower partial pressure of $C_4$ hydrocarbons than the absorbent oil, whereby $C_4$ and lower hydrocarbons are flashed off and the $C_5$ and higher hydrocarbons are retained in the absorbent oil.

HENRY JANNEY NICHOLS, JR.
GEORGE L. MATEER.